(12) United States Patent
Gregor et al.

(10) Patent No.: US 8,205,629 B2
(45) Date of Patent: Jun. 26, 2012

(54) REAL TIME LEAD-LINE CHARACTERIZATION FOR MFC FLOW VERIFICATION

(75) Inventors: Mariusch Gregor, San Jose, CA (US); John W. Lane, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 621 days.

(21) Appl. No.: 12/427,947

(22) Filed: Apr. 22, 2009

(65) Prior Publication Data

US 2009/0266139 A1  Oct. 29, 2009

Related U.S. Application Data

(60) Provisional application No. 61/047,970, filed on Apr. 25, 2008.

(51) Int. Cl.
*F16K 31/12* (2006.01)

(52) U.S. Cl. ............... 137/2; 137/486; 73/1.35

(58) Field of Classification Search ............... 137/2, 12, 137/486, 487, 487.5; 73/1.35, 861.01; 702/47
See application file for complete search history.

(56) References Cited

U.S. PATENT DOCUMENTS

| 4,925,096 | A | 5/1990 | Gill | |
|---|---|---|---|---|
| 5,062,446 | A * | 11/1991 | Anderson | 137/486 |
| 5,684,245 | A | 11/1997 | Hinkle | |
| 5,944,049 | A | 8/1999 | Beyer et al. | |
| 6,523,563 | B2 | 2/2003 | Cho et al. | |
| 7,174,263 | B2 * | 2/2007 | Shajii et al. | 73/861 |
| 7,424,895 | B2 * | 9/2008 | Tison et al. | 137/12 |
| 2004/0261492 | A1 | 12/2004 | Zarkar et al. | |
| 2005/0241698 | A1 * | 11/2005 | Lull et al. | 137/487.5 |
| 2006/0005885 | A1 * | 1/2006 | Aardema et al. | 137/513 |
| 2006/0011237 | A1 * | 1/2006 | Tison et al. | 137/487.5 |
| 2006/0123920 | A1 | 6/2006 | Tison et al. | |
| 2006/0217900 | A1 * | 9/2006 | Shajii et al. | 702/45 |
| 2008/0035202 | A1 | 2/2008 | Lee et al. | |

* cited by examiner

*Primary Examiner* — Eric Keasel
(74) *Attorney, Agent, or Firm* — Patterson & Sheridan, LLP (57) ABSTRACT

A method and apparatus that solve the problem of accurate measurement of gas flow so that the delivery of gases in semiconductor processing may be performed with greater confidence and accuracy by performing real-time characterization of a lead-line for mass flow controller (MFC) flow verification are provided. In one embodiment a mass flow verifier (MFV) provides rate of rise information to a controller via a digital interface without correcting for lead-line influences. After receiving the rate of rise data, the tool host computer computes a gas mass correction factor in real-time based on at least one of the following: MFC temperature sensor data, lead-line temperature sensor data, lead-line pressure transducer data, and lead-line volume. The rate of rise data and gas mass correction factor are used to compute accurate mass flow. The accurate mass flow information may be used to calibrate the MFC.

20 Claims, 5 Drawing Sheets

REAL TIME LEAD-LINE CHARACTERIZATION FOR MFC FLOW VERIFICATION

CROSS-REFERENCE TO RELATED APPLICATIONS

This application claims benefit of U.S. Provisional Patent Application Ser. No. 61/047,970, filed Apr. 25, 2008, which is hereby incorporated by reference.

BACKGROUND OF THE INVENTION

1. Field of the Invention

Embodiments described herein generally relate to a method and apparatus for measuring gas flow. More specifically, embodiments of the invention generally relate to a method and apparatus for measuring gas flows that are provided to a semiconductor processing chamber and related utilities.

2. Description of the Related Art

Accurate control of gas flows is an important process control attribute critical to many microelectronic device fabrication processes. Precise control of process gas flows into the processing chamber is required in order to obtain desired processing results, particularly as critical dimensions and film thicknesses shrink.

Conventional gas delivery systems used with semiconductor processing chambers generally include a mass gas flow meter or mass flow controller (MFC) as the primary flow regulation device. However, the accuracy of MFCs may be affected by a plurality of factors that contribute to an uncertainty of the actual gas flow. For example, the accuracy of the MFC will typically vary with changes in temperature, upstream pressure, and downstream pressure. Deviation from the gas flow set point due to MFC inaccuracy may contribute to processing defects, poor emission control and inefficient waste of costly gases.

Although conventional mass flow control systems have proven relatively reliable, field experience with the existing technology has increased the demand for more accurate measurement of flow. For example, poor control of gas flows used in chemical vapor deposition (CVD) or atomic layer deposition (ALD) applications may result in poor film deposition or etching results, which cannot be tolerated in next generation circuit designs.

Therefore, there is a need for an improved method and apparatus for measuring gas flows so that the delivery of gases in a semiconductor processing system may be performed with greater confidence and accuracy.

SUMMARY OF THE INVENTION

A method and apparatus for measuring gas flow are provided. In one embodiment, a mass flow verifier (MFV) for measuring gas flow may be utilized to verify and/or calibrate gas flows utilized for process gas delivery, purge gas delivery, cleaning agent delivery, carrier gas delivery, and remediation gas delivery, among others.

In another embodiment, a method for controlling gas flow in a semiconductor processing system is provided. The method comprises measuring a mass flow of gas without correcting for lead-line influences, determining a gas mass flow correction factor based on real-time pressure and real-time temperature measurements from the lead-line, determining a corrected mass flow of gas using the gas mass flow correction factor and the mass flow of gas information, and adjusting the gas flow in the semiconductor processing system. In one embodiment, the flow rate of gas in the semiconductor processing system is adjusted in response to the corrected mass flow of gas.

In yet another embodiment, a method for controlling gas flow in a semiconductor processing system is provided. The method comprises measuring a rate of rise in pressure due to a flow of gas flowing into a mass flow verifier without correcting for any influences in a lead-line coupling the MFV with a mass flow controller (MFC), determining a gas mass correction factor based on real-time temperature and pressure measurements of gas flowing through the lead-line, determining a mass flow of gas flowing through the lead-line using the gas mass correction factor and the rate of rise in pressure data, and adjusting the gas flow in the semiconductor processing system.

In yet another embodiment, a method for controlling gas flow in a semiconductor processing system is provided. The method comprises measuring a rate of rise in pressure due to a flow of gas flowing into a mass flow verifier (MFV) without correcting for any lead-line influences while simultaneously measuring the pressure and temperature of gas flowing through the lead-line coupling the MFV with a mass flow controller (MFC), transmitting the temperature and pressure measurements from the MFV to a controller coupled with the processing system, determining a mass gas correction factor based on the temperature and pressure measurements, and determining a corrected mass flow of gas with the MFV using the gas mass correction factor and the rate of rise data.

In yet another embodiment, a method for controlling gas flow in a semiconductor processing chamber is provided. The method comprises measuring a rate of rise in pressure due to a flow of gas flowing into a mass flow verifier (MFV) without correcting for any lead-line influences while a controller simultaneously measures the pressure and temperature of gas flowing through the lead-line into the MFV, transmitting the temperature and pressure measurements from the controller to the MFV, and determining a corrected mass flow of gas with the MFV using the gas mass correction factor and the rate of rise in pressure data.

In yet another embodiment, a method for controlling gas flow in a gas delivery system is provided. The gas delivery system comprises a gas source, a mass flow controller (MFC) coupled with the gas source, a mass flow verifier (MFV), a lead-line coupling the mass flow controller with the mass flow verifier, and a temperature and pressure transducer coupled with the lead-line. Furthermore, the gas delivery system is in communication with a controller using analog and digital communication and signals. The MFV measures rate of rise of pressure and sends this information to a controller or tool host computer via a digital interface without correcting for lead-line influences. A gas mass correction factor based on real-time pressure and temperature measurements from the lead-line is determined. A corrected mass flow of gas flowing through the lead-line is determined by the controller using the uncorrected rate of rise information and the gas mass correction factor. The gas flow in the semiconductor processing system is adjusted accordingly.

In yet another embodiment, a method for controlling gas flow in a gas delivery system is provided. The gas delivery system comprises a gas source, a mass flow controller coupled with the gas source, a mass flow verifier, a lead-line coupling the mass flow controller with the mass flow verifier, and a temperature and pressure transducer coupled with the lead-line. Furthermore, the das delivery system is connected to a controller using analog and digital communication and signals. A lead-line coupling a mass flow verifier to a mass flow controller is provided. The real-time pressure and temperature of a gas flowing through the lead-line is measured. The real-time pressure and temperature measurements are transmitted to the mass flow verifier. The lead-line is characterized by the mass flow verifier based on the real-time pressure and temperature measurements and an accurate gas flow is determined.

BRIEF DESCRIPTION OF THE DRAWINGS

So that the manner in which the above recited features described herein can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that features of one embodiment may be beneficially incorporated in other embodiments without further recitation.

DETAILED DESCRIPTION

A Mass Flow Verifier (MFV) validates the accuracy of a Mass Flow Controller (MFC) by measuring the rate of change of pressure in a fixed volume. The MFV utilizes a controlled volume with attached pressure and temperature measurement devices to determine the pressure change during a Rate of Rise (RoR) test. This change in pressure is used to determine flow into the controlled volume of the MFV. The average mass flow of gas into the controlled volume during a time interval delta t ($\Delta t$) is calculated simply by the difference of mass in the volume at time (t)=1 minus the mass at (t)=0 divided by delta t($\Delta t$).

$$\text{Mass Flow} = (m_{T(t=1)} - m_{T(t=0)})/\Delta t \quad m_T = \text{total mass} \tag{0}$$

The connecting line or lead-line between the MFC and the MFV adds an error to the controlled volume of the MFV. Since the lead-line can have a considerable volume, this additional volume must be taken into account. In order to perform a RoR test with attached lead-line, the mass of the gas in the lead-line must be added to the mass of the gas inside the controlled volume of the MFV.

State of the art MFV algorithms characterize the lead-line prior to the MFC flow verification by performing a rate of rise characterization on the lead-line itself utilizing pressure and temperature inside the MFV. However, lead-lines typically exhibit a non-linear pressure drop along the length of the lead-line, and the lead-line usually contains valves, elbows, and other components that cause changes in conductance along the length of the lead-line. Additionally, temperature variation along the lead-line causes changes in gas viscosity and corresponding changes in conductance. State of the art MFV characterizations fail to take into account temperature and pressure variation along the lead-line in steady state and over time. Moreover, state of the art MFV characterizations add significant time to the total process resulting in numerous inaccuracies. Certain embodiments described herein eliminate the time consuming lead-line characterization prior to the MFC flow verification while improving accuracy, repeatability, and reproducibility of the process. The MFC is then used to adjust the flow rate of gas flowing through the system.

Embodiments described herein provide methods and apparatus for accurate measurement of gas flow so that the delivery of gases in semiconductor processing may be performed with greater confidence and accuracy by performing a real-time lead-line characterization for MFC flow verification. In one embodiment the MFV provides rate of rise information to a controller via a digital interface without correcting for lead-line influences. After receiving the rate of rise data, the tool host computer computes a gas mass correction factor in real-time based on at least one of the following: MFC temperature sensor data, lead-line temperature sensor data, lead-line pressure transducer data, and lead-line volume. The rate of rise data and gas mass correction factor are used to compute accurate mass flow. The accurate mass flow information may be used to calibrate the MFC. The MFC is then used to regulate the flow of gas accordingly.

In another embodiment, the controller provides at least one of the MFC temperature sensor data, lead-line temperature sensor data, lead-line pressure transducer data, and lead-line volume to the MFV via, for example, a digital interface. Some or all of the temperature, pressure, and volume information is then used by the MFV to characterize the lead-line more accurately and calculate accurate mass flow. The controller can obtain the accurate mass flow data via the interface and may use the data to calibrate the MFC.

Figure 1:
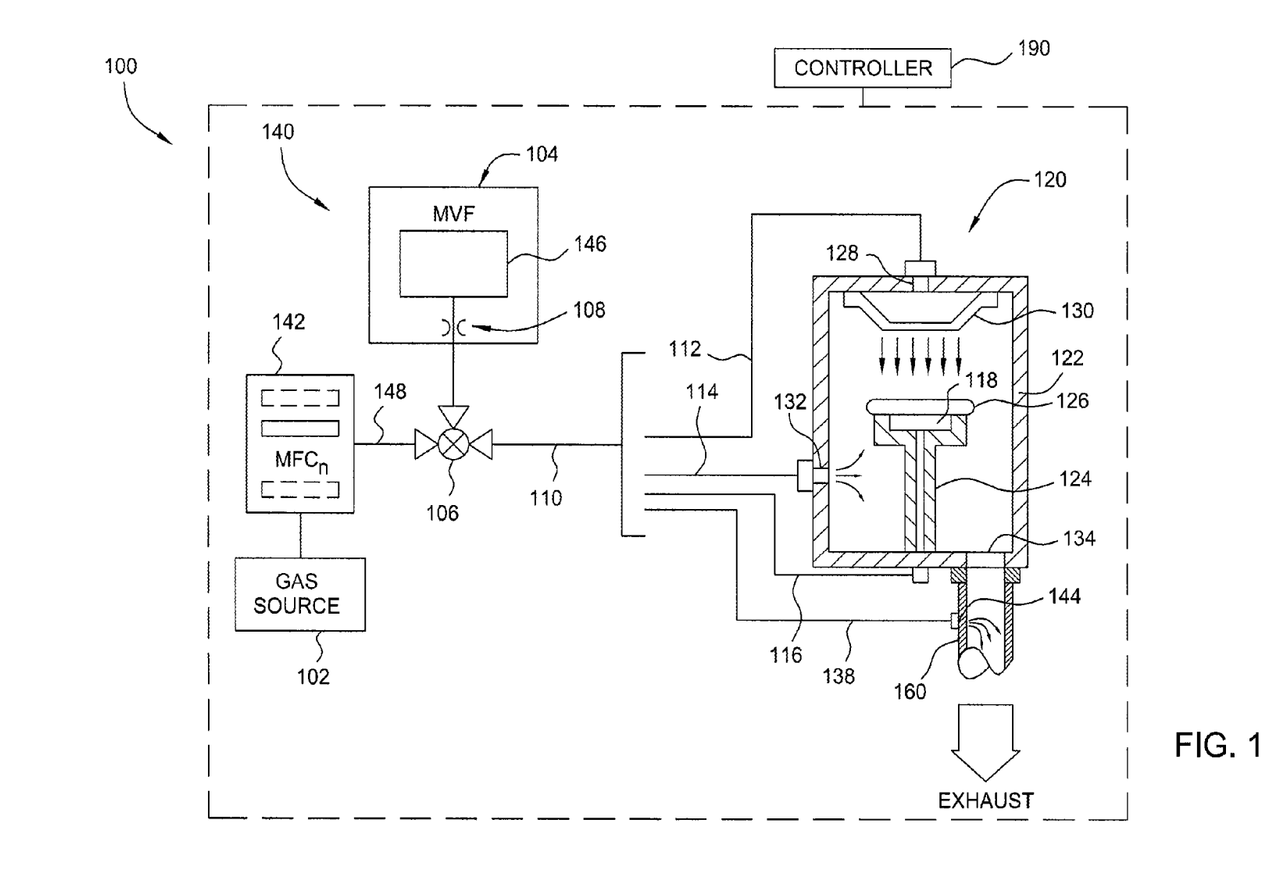
FIG. 1 is a simplified schematic of a gas delivery system having a mass flow verifier in accordance with one embodiment described herein.

FIG. 1 depicts a simplified schematic of a substrate processing system 100 having one embodiment of a gas delivery system 140 comprising a mass flow verifier 104, a mass flow controller 142, and a lead-line 148 coupled to an exemplary semiconductor processing chamber 120. The processing chamber 120 may be configured to perform chemical vapor deposition (CVD), atomic layer deposition (ALD), physical vapor deposition (PVD), etch, ion implant, thermal processing, ashing, degassing, orientation or other vacuum processing techniques.

The processing chamber 120 includes a substrate support 124 disposed in a chamber body 122. The substrate support 124 generally supports a substrate 126 during processing. The substrate support 124 generally includes a passage formed therethrough for delivering a heat transfer gas (hereinafter referred to as backside gas) to a volume 118 defined between the substrate 126 and substrate support 124. The size of the volume 118 has been exaggerated in FIG. 1 for clarity. Examples of common backside gases include helium, nitrogen and argon.

The chamber body 122 generally includes at least one process gas inlet port 128 and a pumping port 134. The process gas inlet port 128 generally provides process and optionally other gases to the interior volume of the processing chamber 120 to facilitate substrate processing, as is conventionally known. The gases entering the chamber body 122 may be distributed across the substrate 126 by a gas distribution plate, or a showerhead 130.

The pumping port 134 is formed in the chamber body 122. The pumping port 134 is generally coupled to a pumping system (not shown) that controls the chamber pressure and removes processing by-products from the interior volume of the chamber body 122. The pumping system typically includes one or more vacuum pumps and throttle valves, which are not shown.

A treatment gas port 144 may be provided to deliver remediation gases into a conduit 160 carrying the effluent stream exiting the chamber body 122 via the pumping port 134. For example, gases may be provided to react and/or absorb hazardous reaction by-products, excess process gases or gaseous chamber waste to facilitate removal and/or recovery of certain materials from the effluent stream.

A purge port 132 may also be provided in the chamber body 122. Inert gases may be provided through the purge port 132 into the processing chamber 120 to prevent process gases and/or process by-products from entering certain regions of the chamber 120. Examples of purge gases include nitrogen and helium.

Gases are generally provided to the inlet port 128, the volume 118, the purge port 132 and the treatment gas port 144 from one or more gas delivery circuits. Each gas delivery circuit generally includes a mechanism for the precise control of the gases flowing therethrough, and at least one of which, may be configured as the gas delivery system 140 described herein. For the sake of brevity, one gas delivery system 140 is shown coupled to gas delivery lines 112, 114, 116, 138 respectively routed to the inlet port 128, the volume 118, the purge port 132 and the treatment gas port 144. In practice, each line 112, 114, 116, 138 may be respectively coupled to dedicated, separate circuit gas delivery systems 140.

In one embodiment, the gas delivery system 140 includes a gas source 102, a mass flow controller (MFC) 142, a diverter valve 106, a lead-line 148, and a mass flow verifier (MFV) 104. In practice, the gas delivery system 140 may contain multiple MFCs, valves, lead-lines, and MFVs. The diverter valve 106 selectively directs flow from the gas source 102 to the mass flow verifier 104, one of the lines 112, 114, 116, 138 through the conduit 110, or other components. The MFC 142 is disposed between the gas source 102 and the diverter valve 106. The MFC 142 is generally utilized to monitor and control the flow from the gas source 102 into the mass flow verifier 104, the conduit 110 coupling the gas delivery system 140 to the processing chamber 120, and/or other components.

The MFV 104 is configured to accurately measure gas flow. In certain embodiments, the MFV 104 has a known or predetermined volume. In certain embodiments, the MFV 104 may be part of a gas control system such as a gas panel. In certain embodiments, the MFV 104 includes an orifice 108 and may include a sensing circuit 146. The orifice 108 is disposed between the sensing circuit 146 and the diverter valve 106. The orifice 108 may be sized such that the restriction maintains a chocked flow condition. In one embodiment, the size of the orifice 108 is selected to simulate the restriction of the actual processing chamber 120. This creates conditions similar to the MFC 142 flowing into the processing chamber 120 under which to perform flow verifications using the MFV 104, while not requiring flow into the actual processing chamber 120. The size of the orifice 108 may be determined by experimentation, empirical analysis or by other suitable method. In one embodiment, the orifice 108 may be determined by measuring the pressure downstream of the orifice 108 and adjusting the size of the orifice 108 until a desired pressure is realized. In another embodiment, the size of the orifice 108 may be selected to be different than the restriction of the actual processing chamber 120, as long as the flow is maintained in a chocked flow condition. One exemplary MFV is disclosed in U.S. Patent Application Publication No. 2008/0035202, titled METHOD AND APPARATUS FOR GAS FLOW MEASUREMENT, to Lee et al., which is hereby incorporated by reference in its entirety.

In one embodiment, the MFV 104 has a known or predetermined volume. Gas flowing into the sensing circuit 146 through the orifice 108 from the gas source 102 will increase the pressure inside the MFV 104, and thus the density of the gas within the MFV 104. Attached pressure and temperature monitors are used to determine the pressure change within the MFV 104. The change in pressure, given the known tank volume, provides information related to the density change within the MFV 104, which is also related to the mass flow rate through the MFC 142 and thus may be utilized to verify and/or calibrate the flow through the MFC 142.

The lead-line 148 fluidly couples the MFC 142 with the MFV 104. The lead-line 148 may contain any number of valves, elbows, manifolds, and other components.

An exemplary embodiment of the processing system 100 further comprises a controller 190 in electronic communication with the gas delivery system 140 and the process chamber 120. The controller 190 may include one or more microprocessors, microcomputers, microcontrollers, client computer systems, dedicated hardware or logic, and combinations thereof. The processing system 100 and controller 190 may also be in electronic communication with networks and server systems.

Figure 2:
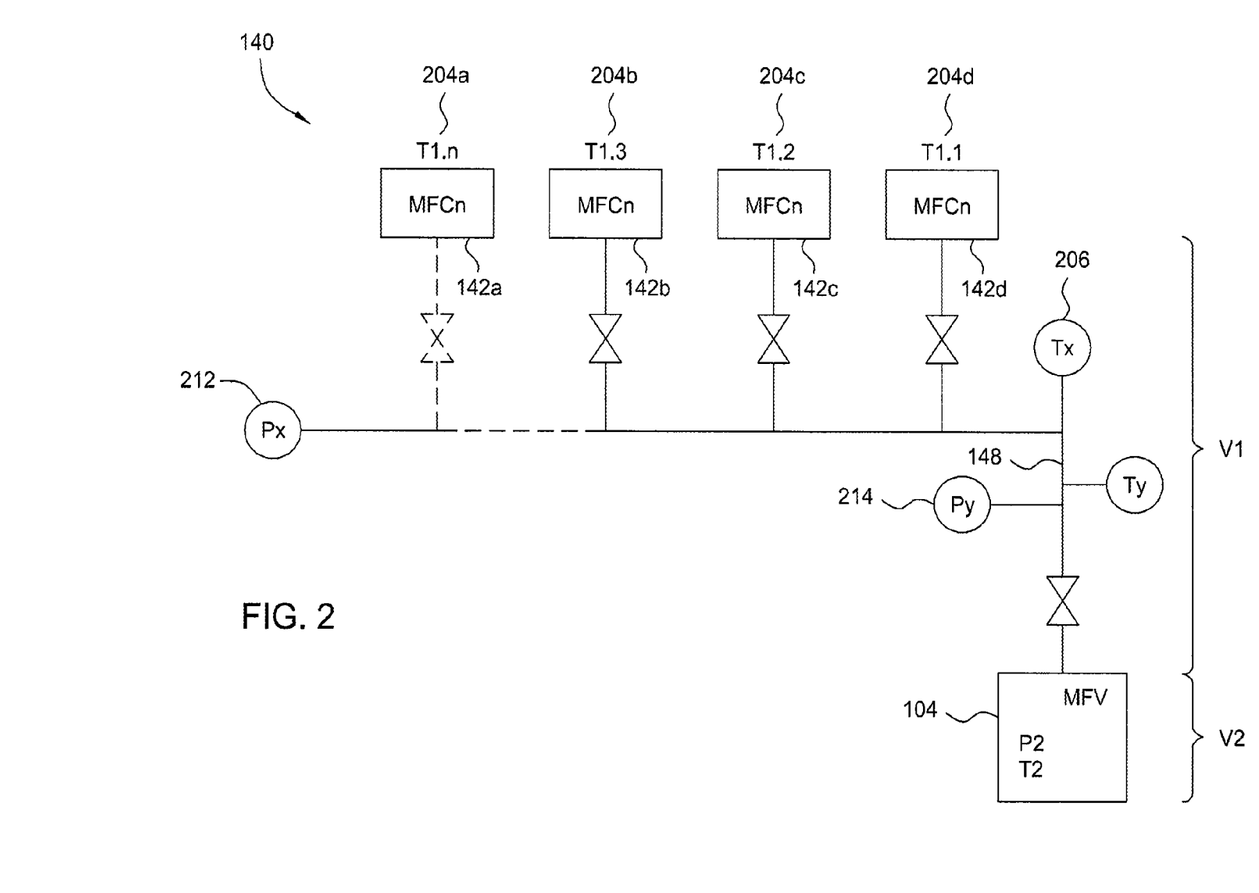
FIG. 2 is a schematic of key components within an integrated gas delivery system in accordance with one embodiment described herein.

FIG. 2 is a schematic of a gas delivery system 140 in accordance with one embodiment described herein. In one embodiment, the gas delivery system 140 includes one or more mass flow controllers ($MFC_1$-$MFC_n$) 142 (142a-d), a MFV 104, a lead-line 148 coupling the one or more MFCs 142 and the MFV 104.

One or more temperature sensors ($T_{1.1}$-$T_{1.n}$) 204a-d, for example a temperature transducer, configured to measure the temperature of gas flowing through each MFC is coupled to each of the one or more MFC's 142. One or more temperature sensors ($T_x$) 206 configured to monitor the gas temperature of gases in the lead-line 148 may be coupled with the lead-line 148. Any number of additional temperature sensors may be positioned along the lead-line 148 to properly monitor variations in temperature along the lead-line 148 and provide a real-time temperature gradient model of the lead-line 148. For example, one or more temperature sensors ($T_y$) 208 may be positioned adjacent to the inlet of the MFV 104 to monitor the temperature of gases entering the MFV 104. In certain embodiments, the MFV 104 contains an integrated temperature sensor.

Any number of pressure sensors, for example a pressure transducer, may be positioned in the gas delivery system 140. One or more pressure transducers ($P_x$) 212 configured to monitor the pressure of gases in the lead-line 148 may be coupled with the lead-line 148. Any number of additional pressure transducers may be positioned along the lead-line 148 to properly monitor variations in pressure along the lead-line 148 and provide a real-time pressure gradient model of the lead-line 148. For example, one or more pressure transducers ($P_y$) 214 may be positioned adjacent to the inlet of the MFV 104 to monitor the pressure of gases entering the MFV 104. In certain embodiments, the MFV 104 contains an integrated pressure transducer.

In one embodiment, the one or more pressure transducers positioned along the lead-line may be used to monitor and identify stable pressure prior to initiation of the rate of rise test. In another embodiment, predetermined values are used to identify stabilization times prior to initiation of the rate of rise test.

Additionally, those skilled in the art will recognize that the gas delivery system 140 shown in FIG. 2 is simplified to highlight aspects described herein and that gas delivery systems typically include a variety of additional elements not shown in FIG. 2.

Figure 3:
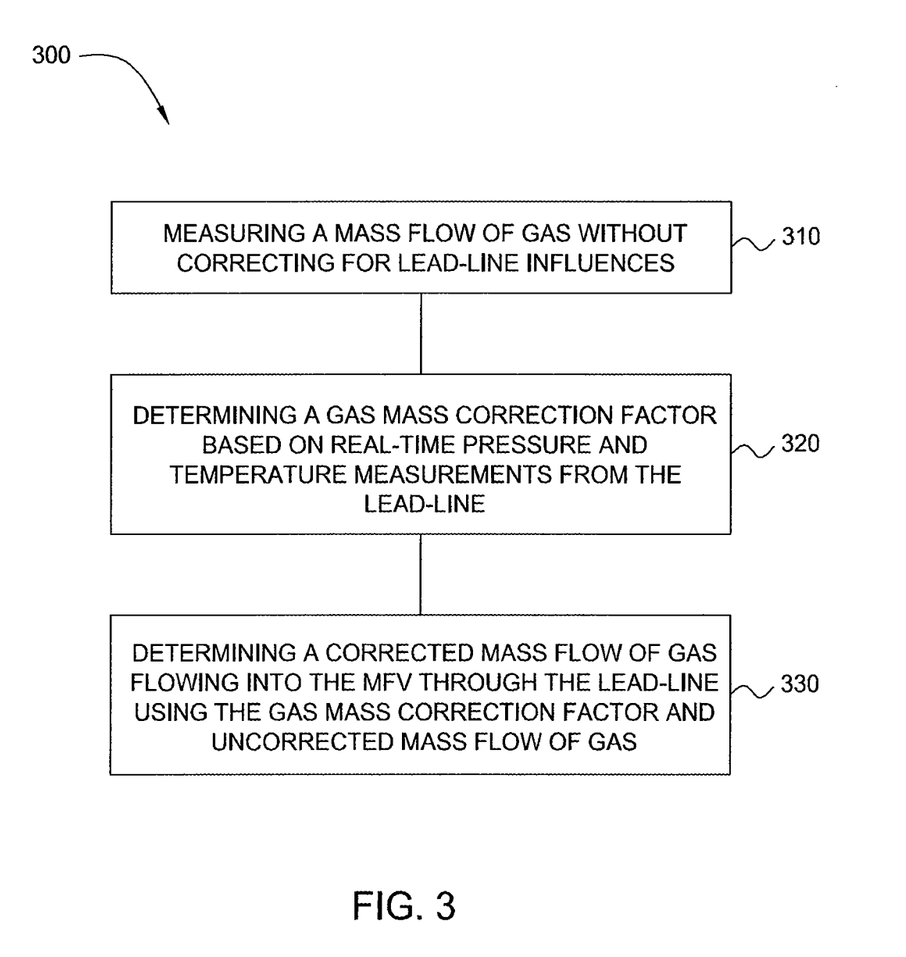
FIG. 3 is a process flow diagram describing a method of using Mass Flow Verification (MFV) to verify the accuracy of Mass Flow Controllers (MFC) in accordance with one embodiment described herein.

FIG. 3 is a process flow diagram 300 describing a method of using Mass Flow Verification (MFV) to verify the accuracy of Mass Flow Controllers (MFC) in accordance with one embodiment described herein. At step 310, an uncorrected mass flow of a gas is measured. The uncorrected mass flow of gas may be determined through a rate of rise test. The MFV 104 measures rate of rise in pressure due to the flow of gas flowing into the MFV 104 without correcting for any influences from the lead-line 148. Influences in the lead-line include valves, elbows and other components which may change the conductance along the length of the lead-line. In certain embodiments, the uncorrected rate of rise information may be transmitted from the mass flow verifier 104 to a computing environment where the uncorrected flow information may be stored in the controller 190. In certain embodiments, the uncorrected rate of rise information may be transmitted directly to the controller 190. In certain embodiments, the uncorrected rate of rise information is stored in the mass flow verifier 104.

At step 320, a gas mass correction factor based on real-time temperature and pressure measurements from the lead-line is determined. The gas mass correction factor may be determined using known algorithms. In one embodiment, the real-time temperature and pressure measurements are obtained simultaneously while measuring the uncorrected mass flow of gas in step 310. In one embodiment, the calculation of the gas mass correction factor may be performed in parallel with step 310. The real-time temperature of the gas flowing through the lead-line 148 may be collected using any of the following sensors either alone or in combination: the MFC temperature sensors $(T_{1,n}-T_{1,1})$ 204a-d, the lead-line manifold temperature sensors $(T_x)$ 206, and the inlet temperature sensors $(T_y)$ 208 of the MFV 104. The real-time pressure of the gas flowing through the lead-line 148 may be collected using any of the following sensors either alone or in combination: the manifold pressure transducer $(P_x)$ 212, and the inlet temperature sensors $(P_y)$ 214 of the MFV 104. In certain embodiments, additional pressure and/or temperature sensors may be added in order to improve the accuracy of temperature measurement in the lead-line 148.

At step 330, the mass flow of gas flowing into the MFV 104 through the lead-line 148 is determined using the gas mass correction factor and uncorrected rate or rise information. The mass flow of gas may be determined using known algorithms. The mass of gas flowing through the lead-line 148 may be added to the mass of gas inside the controlled volume of the MFV 104 to calculate the total mass of gas in the MFV 104 and the lead-line 148. In certain embodiments, the corrected gas flow may be stored in the controller 190 and later used to calibrate the MFC 142. The flow of gas through the system may be adjusted accordingly.

Figure 4:
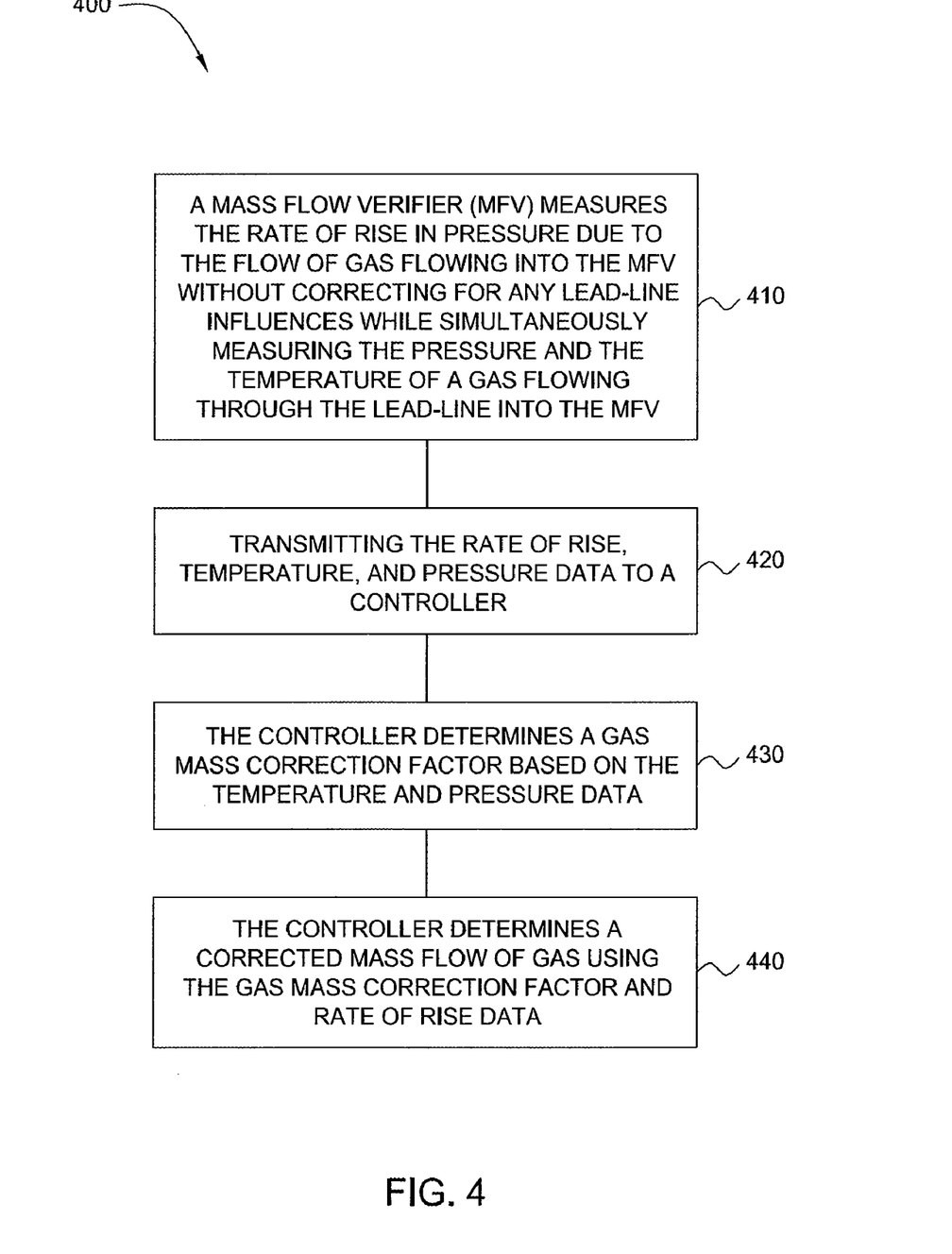
FIG. 4 is a process flow diagram describing a method of using Mass Flow Verification (MFV) to verify the accuracy of Mass Flow Controllers (MFC) in accordance with another embodiment described herein.

FIG. 4 is a process flow diagram 400 describing a method of using Mass Flow Verification (MFV) to verify the accuracy of Mass Flow Controllers (MFC) in accordance with another embodiment described herein. In step 410, the MFV 104 measures the rate of rise in pressure due to the flow of gas flowing into the MFV 104 without correcting for any influences of the lead-line 148 while simultaneously measuring the pressure and temperature of gas flowing through the lead-line 148. In step 420, the rate of rise, temperature, and pressure data is transmitted to the controller 190. In step 430, the controller 190 calculates a gas mass correction factor based on the temperature and pressure data. The gas mass correction factor may be based on at least one of the following: MFC temperature sensor data, lead-line temperature sensor data, lead-line pressure transducer data, and lead-line volume. In step 440, the controller 190 calculates a corrected mass flow of gas using the gas mass correction factor and rate of rise data. In certain embodiments, the corrected mass flow may be stored in the controller 190 and later used to calibrate the MFC 142. The flow of gas through the system may be adjusted accordingly.

Figure 5:
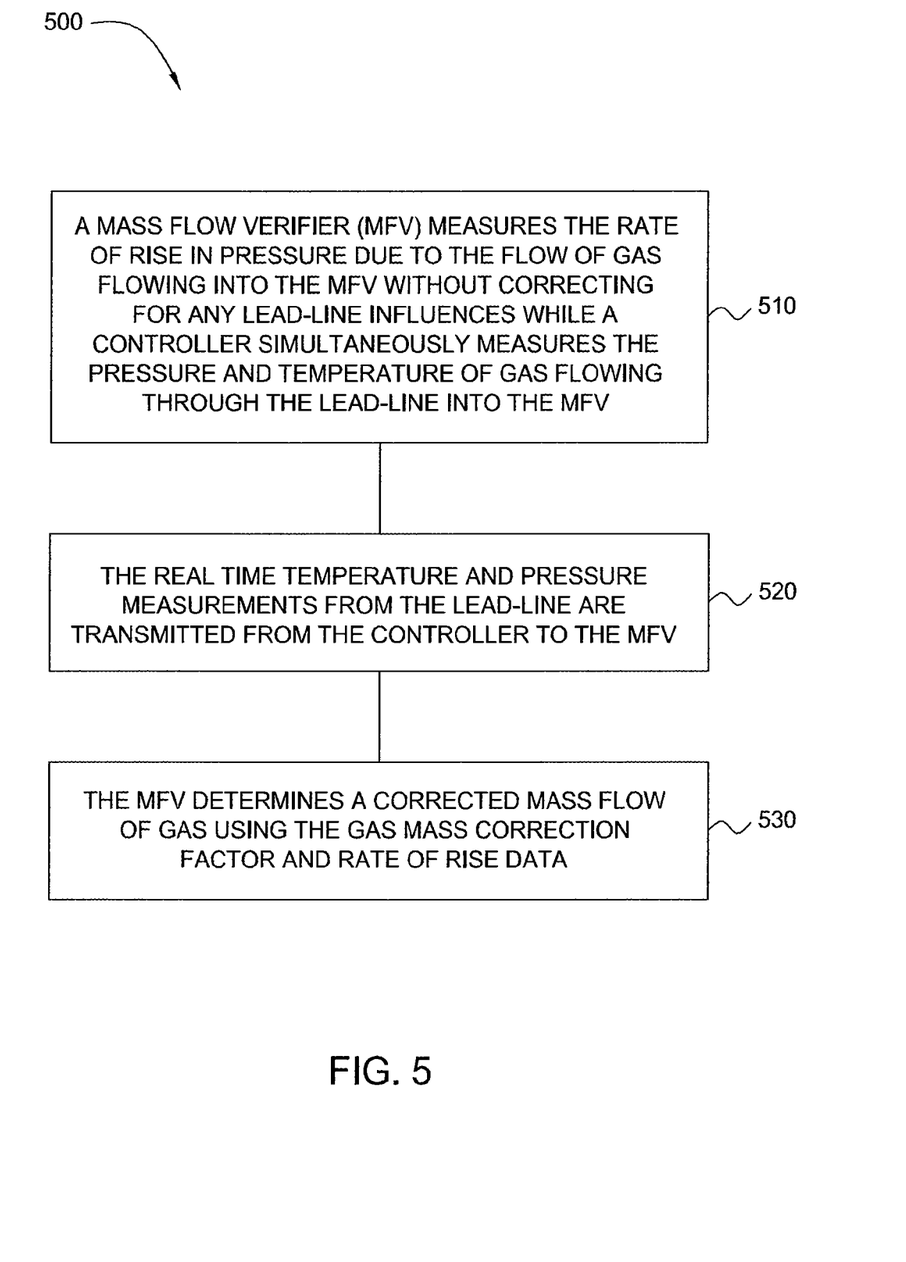
FIG. 5 is a process flow diagram describing a method of using Mass Flow Verification (MFV) to verify the accuracy of Mass Flow Controllers (MFC) in accordance with yet another embodiment described herein.

FIG. 5 is a process flow diagram 500 describing a method of using Mass Flow Verification (MFV) to verify the accuracy of Mass Flow Controllers (MFC) in accordance with yet another embodiment described herein. At step 510, an uncorrected mass flow of a gas is measured. The MFV 104 measures the rate of rise in pressure due to flow of gas flowing into the MFV 104 without correcting for any influences from the lead-line 148. In certain embodiments, the uncorrected rate of rise information may be transmitted from the mass flow verifier 104 to the computing environment where the uncorrected flow information may be stored in the client computing system. In certain embodiments, the uncorrected rate of rise information may be transmitted directly to the client computer system. In certain embodiments, the uncorrected rate of rise information is stored in the mass flow verifier 104.

At step 520, the real time pressure and temperature measurements from the lead-line 148 are transmitted from the controller 190 to the MFV 104 in parallel to step 510. In certain embodiments the pressure and temperature information may be transmitted directly to the MFV 104 by connecting the transducer interfaces directly to the MFV 104. In certain embodiments the pressure and temperature information may be stored in the controller 190 or the MFV 104. In certain embodiments, transmission of lead-line 148 data may occur after step 510. The real-time temperature of the gas flowing through the lead-line 148 may be collected using any of the following sensors either alone or in combination: the MFC temperature sensors $(T_{1,n}-T_{1,1})$ 204a-d, the manifold temperature sensors $(T_x)$ 206, and the inlet temperature sensors $(T_y)$ 208 of the MFV 104. The real-time pressure of the gas flowing through the lead-line 148 may be collected using any of the following sensors either alone or in combination: the manifold pressure transducer $(P_x)$ 212, and the inlet temperature sensors $(P_y)$ 214 of the MFV 104. In certain embodiments, additional pressure transducers may be added in order to improve the accuracy of pressure measurement along the lead-line 148. In certain embodiments, additional sensors may be added in order to improve the accuracy of temperature measurement in the lead-line 148.

At step 530, the mass flow of gas flowing into the MFV through the lead-line is determined using the real time pressure and temperature information and the uncorrected rate of rise information. In certain embodiments, the mass gas flow may be stored in the computing system and later used to calibrate the MFC 142. The flow of gas flowing through the system is adjusted accordingly.

During the RoR test, the pressure in the MFV 104 and the pressure in the lead-line 148 will both increase. The flow conductance of the lead-line is a function of pressure and gas temperature. Assuming a constant flow and temperature the pressure rise will be linear. However, lead-lines generally contain valves, elbows and other components, which cause the conductance to change along the length of the lead-line. There may also be temperature variation along the lead-line that causes changes in the gas viscosity and corresponding changes in conductance. These changes in conductance result in a non-linear pressure drop. As a result, it is very difficult to accurately determine the mass of gas in the MFV independently if a lead-line is connected. Instead the MFV reading will be based on the pressure and temperature inside the MFV, which indicates an estimated mass lower than the actual mass in the total volume of the MFV and the lead-line. The additional pressure and temperature transducer information corrects for uniform and non-uniform mass distribution of gas inside the lead-line in real time. The conductance gradient along the manifold and over time can be defined by using an average pressure and temperature and/or a pressure and temperature gradient model.

Embodiments described herein provide methods and apparatus for the accurate measurement of gas flow so that the delivery of gases in semiconductor processing may be performed using real-time lead-line characterization for MFC flow verification. The real-time lead-line characterization eliminates the time consuming lead-line characterization prior to the MFC flow verification while improving accuracy, repeatability, and reproducibility of the process.

While the foregoing is directed to embodiments described herein, other and further embodiments of the invention may be devised without departing from the basic scope thereof, and the scope thereof is determined by the claims that follow.

The invention claimed is:

1. A method for controlling gas flow in a semiconductor processing system, comprising:
    measuring a mass flow of gas without correcting for lead-line influences;
    determining a gas mass flow correction factor based on real-time pressure and temperature measurements from the lead-line;
    determining a corrected mass flow of gas using the gas mass flow correction factor and the mass flow of gas information; and
    adjusting the gas flow in the semiconductor processing system, wherein the measuring a mass flow of gas without correcting for lead-line influences and the real-time temperature and pressure measurements from the lead-line are obtained simultaneously.

2. The method of claim 1, further comprising calibrating a mass flow controller using the corrected mass flow of gas.

3. The method of claim 1, wherein the mass flow of gas is determined through a rate of rise test.

4. The method of claim 3, wherein the rate of rise test is performed using a mass flow verifier (MFV) with a controlled volume with attached pressure and temperature measurement devices.

5. The method of claim 4, wherein the results of the rate of rise test are transmitted from the mass flow verifier to a computing environment where the mass flow of gas data may be stored in a controller.

6. The method of claim 1, wherein the corrected mass flow of gas is added to a mass of gas inside the controlled volume of a mass flow verifier (MFV) to calculate a total mass of gas within the MFV and the lead-line.

7. A method for controlling gas flow in a semiconductor processing system, comprising:
    measuring a mass flow of gas without correcting for lead-line influences;
    determining a gas mass flow correction factor based on real-time pressure and temperature measurements from the lead-line;
    determining a corrected mass flow of gas using the gas mass flow correction factor and the mass flow of gas information; and
    adjusting the gas flow in the semiconductor processing system, wherein the measuring a mass flow of gas without correcting for lead-line influences and the determining a gas mass flow correction factor based on real-time pressure and temperature measurements from the lead-line occur simultaneously.

8. The method of claim 7, further comprising calibrating a mass flow controller using the corrected mass flow of gas.

9. The method of claim 7, wherein the mass flow of gas is determined through a rate of rise test.

10. A method for controlling gas flow in a semiconductor processing system, comprising:
    measuring a rate of rise in pressure due to a flow of gas flowing into a mass flow verifier (MFV) without correcting for any influences in a lead-line coupling the MFV with a mass flow controller (MFC);
    determining a gas mass correction factor based on real-time temperature and pressure measurements of gas flowing through the lead-line;
    determining a mass flow of gas flowing through the lead-line using the gas mass correction factor and the rate of rise in pressure data; and
    adjusting the gas flow in the semiconductor processing system, wherein measuring the rate of rise in pressure and determining a gas mass correction factor occur simultaneously.

11. The method of claim 10, further comprising adding the mass of gas flowing through the lead-line to the mass of gas inside the controlled volume of the mass flow verifier to obtain the total mass of gas in the mass flow verifier and the lead-line.

12. The method of claim 10, further comprising calibrating a mass flow controller using the mass flow of gas flowing through the lead-line.

13. The method of claim 10, wherein the gas mass correction factor corrects for uniform and non-uniform mass distribution of gas inside the lead-line in real time.

14. The method of claim 10, wherein the MFV measures the rate of rise in pressure and the real-time temperature and pressure of gas flowing through the lead-line.

15. The method of claim 10, wherein a controller coupled with the processing system calculates the gas mass correction factor based on the temperature and pressure data.

16. The method of claim 15, wherein the controller calculates a corrected mass flow of gas using the gas mass correction factor and the rate of rise in pressure.

17. A method for controlling gas flow in a semiconductor processing system, comprising:
    measuring a rate of rise in pressure due to a flow of gas flowing into a mass flow verifier (MFV) without correcting for any lead-line influences while a controller simultaneously measures the pressure and temperature of gas flowing through the lead-line into the MFV;
    transmitting the temperature and pressure measurements from the controller to the MFV; and
    determining a corrected mass flow of gas with the MFV using the gas mass correction factor and rate of rise in pressure data.

18. The method of claim 17, wherein the transmitting the temperature and pressure measurements from the controller to the MFV occurs while measuring the rate of rise in pressure.

19. The method of claim 17, further comprising calibrating a mass flow controller using the corrected mass flow of gas.

20. The method of claim 17, wherein the lead-line couples the MFV with a mass flow controller (MFC).

* * * * *